3,354,165
AKYLATION OF PYRIDINE COMPOUNDS
Richard C. Myerly and Kurt Weinberg, Charleston,
W. Va., assignors to Union Carbide Corporation,
a corporation of New York
No Drawing. Filed July 16, 1965, Ser. No. 472,673
8 Claims. (Cl. 260—290)

ABSTRACT OF THE DISCLOSURE

Selective methylation of pyridine compounds which have a hydrogen substituent in at least one of the alpha positions of the pyridine ring is effected by contact with carbon monoxide and hydrogen in the presence of a catalyst of nickel and nickel oxide at a temperature in the range of from about 150° C. to about 400° C.

---

The instant invention relates to a novel process for effecting the substitution of the pyridine ring. This invention specifically provides a novel method for selective alkylation, particularly for methylation, of a broad spectrum of pyridine compounds.

Despite the aromatic nature of the pyridine ring, pyridine compounds cannot be alkylated with Friedel-Crafts catalysts as are aromatic compounds. Consequently a number of diverse methods have been developed for the preparation of alkyl pyridines. For example, α-picoline has been prepared by heating pyridinium methyl iodide to 300° C., and small yields of about 3 percent of methylpyridines have been obtained by vapor phase reaction of methanol and pyridine at 400° C. to 500° C. Another method which has been employed for methylating the pyridine ring involves heating pyridine in acetic or propionic acid with lead acetate in the presence of a small amount of an organic active hydrogen-containing compound.

A still further method for preparing alkyl pyridines is disclosed by Reinecke and Kray, J. Am. Chem. Soc. 86, 5355 (1964). This preparative procedure involves the reaction of pyridine with carbon monoxide in the presence of an excess of Raney nickel at 225° C. and 1.7 atmospheres pressure. This process is a batch procedure and requires 14 hours reaction time to convert 30–40 percent of the pyridine to α-picoline. This process must be run in a solvent medium at elevated pressure, and moreover requires reactivation of the Raney nickel catalyst following each batch run, since part of the hydrogen bound on the catalyst is consumed during the reaction. Accordingly, the lengthy reaction time, the batch method restriction, and the necessity to regenerate the Raney nickel catalyst essentially precludes conducting this process on a commercial scale.

The novel process of this invention provides a useful and economical process to directly methylate a pyridine ring. For example, the novel process of this invention provides an economically attractive route to synthesize α-picoline, 2,6-lutidine, and the like methyl-substituted pyridines from pyridine itself or substituted pyridine.

Applicants' copending application Ser. No. 396,407 filed Sept. 14, 1964, provides another novel process for alkylating pyridine compounds using a catalyst similar to that employed in the instant invention. In addition, applicants' copending application Ser. No. 396,404 filed Sept. 14, 1964, relates to a process for demethylating pyridine compounds.

In accordance with this invention, there is provided a novel process for selectively methylating pyridine compounds by contacting the pyridine compounds with carbon monoxide and hydrogen in the presence of a catalyst of nickel and nickel oxide. By virtue of the directive effect of the heterocyclic nitrogen atom of the pyridine compound to be methylated, this novel alkylation process will accomplish the addition of methyl groups to the pyridine ring at the position alpha to the heterocyclic atom. It is accordingly possible to selectively methylate a broad spectrum of pyridine compounds to add one or more methyl groups, and to do so selectively, introducing the methyl groups at position alpha to the heterocyclic nitrogen atom. For example, pyridine may be methylated to obtain α-picoline, and this product may be subsequently further methylated to obtain 2,6-lutidine. Furthermore, alkyl-substituted pyridines such as 3-ethylpyridine may be methylated to produce the α-methyl product, i.e., 2-methyl-5-ethylpyridine.

According to the process of this invention a methyl group is substituted for a hydrogen atom at one of the positions alpha to the heterocyclic nitrogen atom of a pyridine ring. Thus, the pyridine compounds which may be methylated by the process of the instant invention are characterized by a hydrogen substituent in at least one of the alpha positions of a heterocyclic pyridine ring. The pyridine compounds useful in the novel process of this invention contain at least one integral pyridine ring alone or as part of a fused polycylic structure containing at least one and up to two integral pyridine rings. The compounds useful as starting materials in the instant novel process include pyridine, polycyclic compounds wherein the pyridine ring is fused to a homocarbocyclic ring such as quinoline, isoquinoline, and the pyridines, e.g., 5(H)-1-pyridine and the like; polycyclic compounds wherein the pyridine ring is fused to two homocarbocyclic rings, e.g., benzoquinoline; and polycyclic compounds wherein two pyridine rings are fused together, such as the naphthyridines, e.g., 1,5-naphthyridine, 1,6-naphthyridine, 1,7-naphthyridine, 1,8-naphthyridine, 2,6-naphthyridine, 2,7-naphthyridine, and the like. It is pointed out that the useful starting materials for the instant novel process include the above compounds and their substituted derivatives which contain at least one hydrogen atom in a position alpha to the heterocyclic nitrogen atom. Preferred substituents are alkyl groups containing from about 1 to 6 carbon atoms. Such alkyl groups remain for the most part completely unaffected by the methylation. Accordingly, the preferred starting materials useful in the instant novel process may be characterized as consisting of carbon, hydrogen and one to two heterocyclic nitrogen atoms corresponding to the number of fused pyridine rings in the compound. Particularly preferred starting materials are pyridine and the alkyl-substituted pyridines containing at least one α-hydrogen atom.

The following table lists various exemplary starting materials together with the methyl-substituted products which may be produced therefrom by alkylation according to the instant novel process. The list is illustrative and not limiting inasmuch as it is deemed within the skill of the chemist to extrapolate the principles embodied herein to produce other compounds from analogous starting materials.

Starting material: Product
- Pyridine — α-Picoline.
- α-Picoline — 2,6-lutidine.
- γ-Picoline — 2,4-lutidine.
- β-Picoline — 2,5-lutidine.
- 2,4-lutidine — 2,4,6-trimethylpyridine.
- 3-ethylpyridine — 2-methyl-5-ethylpyridine.
- 3-hexylpyridine — 2-methyl-5-hexylpyridine.
- 2-methyl-5-ethylpyridine — 2,6-dimethyl-3-ethylpyridine.
- 4-propylpyridine — 2-methyl-4-propylpyridine.
- 2-methyl-4-propylpyridine — 2,6-dimethyl-4-propylpyridine.
- Quinoline — 2-methylquinoline.
- 2-methylquinoline — 2,4-dimethylquinoline.
- Isoquinoline — 1-methylisoquinoline.
- 1-methylisoquinoline — 1,3-dimethylisoquinoline.
- 1,8-naphthridine — 2-methyl-1,8-naphthridine.
- 2-methyl-1,8-naphthridine — 2,7-dimethyl-1,8-naphthridine.

The novel process is carried out by contacting the pyridine compound with carbon monoxide and hydrogen in the presence of the nickel-nickel oxide catalyst. The alkylation reaction may be illustrated by the following equation which shows the production of α-picoline from pyridine:

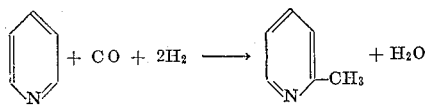

Stoichiometrically, therefore, the process requires one mole of carbon monoxide and two moles of hydrogen for each mole of pyridine compound to be monomethylated. However, an excess of carbon monoxide and hydrogen increases overall conversion in the process, and hence is preferred. The reaction is operative to produce a methylated pyridine product employing amounts of carbon monoxide and hydrogen ranging from less than that stoichiometrically required to unlimited excesses of carbon monoxide and hydrogen over the pyridine. It can be appreciated, however, that too large an excess of carbon monoxide and hydrogen becomes impractical processwise since recycling of large gas quantities would be cumbersome and uneconomical. It is preferred to use a moderate excess of carbon monoxide and hydrogen such that the carbon monoxide-hydrogen-pyridine compound mole ratio is in the range of about 2:2:1 to about 4:8:1.

Methylation can also be effected without the addition of hydrogen, if the process is run at a temperature sufficiently high to effect the partial decomposition of pyridine over the catalyst. Under such conditions, hydrogen needed for the methylation reaction is supplied from the decomposed pyridine compound. However, the yields and efficiencies obtainable by operation without addition of hydrogen are undesirably low, and accordingly operation of the novel process without addition of hydrogen is not preferred.

The reaction is conducted in the vapor phase preferably at elevated temperatures. Depending upon the pyridine compound to be methylated, the temperature may vary from about 150° C. to about 400° C. For example, the methylation of pyridine begins at about 210° C. and proceeds most efficiently at temperatures in the range of 260° C.–295° C. At higher temperatures yields tend to decrease due to a significant amount of decomposition of the pyridine ring. For most reactants, the process may be suitably conducted at a temperature within the range of from about 250° C. to 360° C. In all cases, care should be taken that the operating temperature does not result in extensive decomposition of the pyridine compound which is the starting material.

The alkylation according to the instant invention takes place in the presence of a catalyst of nickel and nickel oxide. Suitable catalysts include stabilized nickel and nickel oxide containing less than 50 percent and preferably from about 30 to 40 percent free nickel. These catalysts are preferably employed in finely divided form. The catalysts may be prepared by partial reduction of nickel oxide until the desired content of free nickel is achieved. The catalyst is employed with gross support such as kieselguhr, silica, clay or the like, but is also extremely effective if used alone without support.

As hereinbefore stated, the reaction is conducted in the vapor phase and is preferably carried out by passing the pyridine compound, the carbon monoxide and hydrogen over a heated catalyst bed. Contact time is not critical to the operability of the process but is an extremely important parameter in optimizing yields. At very short reaction times, the yield of the methylated product is low. On the other hand, if the reactants are maintained in the presence of the catalyst for an unduly long period, yield again is low by virtue of decomposition of the reaction product over the catalyst. Accordingly, contact times may vary from about 2 to as high as 30 seconds depending upon the reactants being employed. With most reactants, the yield of methylated product reaches a maximum when contact times of from about 5 to about 15 seconds are employed, and hence such contact times are preferred.

The reaction may suitably be conducted in a heated tubular reactor in which the catalyst is maintained with or without support as discussed above. To recover the methylated pyridine compound, the gaseous effluent from the tubular reactor may be cooled whereupon the excess carbon monoxide and hydrogen gas can be separated from the liquid reaction product which includes the methylated pyridine product and unreacted pyridine compound. Fractional distillation or other well known techniques may be used to isolate the desired methyl-substituted product.

Pressure is entirely non-critical and the process may be conducted at subatmospheric, atmospheric, or superatmospheric pressures. Although operation at pressures higher than atmospheric might be deemed desirable processwise, no appreciable advantage accrues using subatmospheric pressure.

It should be pointed out that the instant novel process may be employed to introduce more than one methyl group in the alpha position of a pyridine compound. Such dimethylation can readily be effected by increasing the ratio of carbon monoxide and hydrogen to pyridine and by increasing contact time. Caution should be exercised, however, in that the contact time is not extended so long as to result in extensive decomposition of product. Particularly when fresh catalyst is employed, contact times under 15 seconds can often give high yields of dimethylated product when a high molar ratio of carbon monoxide and hydrogen to pyridine compound is employed.

The following examples are illustrative.

In all examples, the catalyst employed was nickel and nickel oxide containing about 60 to 70 percent by weight nickel with a ratio of reduced nickel to total nickel of 0.55 to 0.65. The catalysts variously contained small amounts of nickel sulfide ranging up to about 1 percent by weight.

Example I

Over a period of one hour, 1.24 moles of pyridine (98 grams), 1.24 moles of hydrogen (2.94 grams), and 2.48 moles of carbon monoxide (69.4 grams) were continuously pumped into the preheater of a tubular reactor. The vaporous mixture was subsequently passed over 600 milliliters of a nickel-nickel oxide catalyst maintained in an externally heated tubular reactor having a length of three feet and an inside diameter of 1¼ inches. The catalyst temperature was maintained at 265° C. to 270° C. Contact time was 11 seconds. The exiting vapors were cooled resulting in the condensation of a liquid product. This product mixture was shaken with concentrated aqueous sodium hydroxide solution; the resulting mixture separated into two layers upon standing. The resulting aqueous layer was separated from the organic layer and was extracted with benzene. The benzene extract was combined with the organic layer and the resulting solution distilled through a fractionating column to yield over the hour period, 58.3 grams of α-picoline which corresponded to 50 percent of theoretical yield. In addition, 46 grams of pyridine which corresponded to 47 percent of the total pyridine fed to the reactor was recovered unreacted.

In like manner when 3-ethylpyridine is employed in this process in the place of pyridine, a product consisting mainly of 2-methyl-5-ethylpyridine is obtained.

In a similar manner when quinoline is employed in the place of pyridine, a product consisting primarily of 2-methylquinoline is obtained.

*Example II*

The reaction was carried out in the same manner as described in Example I with the exception that no hydrogen was added to the vaporous mixture of pyridine and carbon monoxide. Several hundred milliliters of nickel-nickel oxide catalyst were employed in the reactor at a temperature of 286° C. to 295° C. The pyridine and carbon monoxide were present in the ratio of 3.8 moles of carbon monoxide per mole of pyridine. Contact time was 9.4 seconds. The vapors were condensed and separated in the same manner as set forth in Example I. There was obtained an amount of α-picoline corresponding to a 17.3 percent yield. 61.5 percent of the total amount of pyridine fed to the reactor was recovered unreacted.

What is claimed is:

1. A process for selectively substituting a methyl group for a hydrogen atom in at least one of the positions alpha to a heterocyclic nitrogen atom of a pyridine compound which comprises contacting said pyridine compound with carbon monoxide and hydrogen in the presence of a catalyst of nickel and nickel oxide at a temperature of from about 150° C. to about 400° C.

2. The process of claim 1 wherein the carbon monoxide and hydrogen are present in an amount in excess of that stoichiometrically required.

3. The process of claim 1 wherein the mole ratio of carbon monoxide:hydrogen:pyridine is in the range of about 2:2:1 to about 4:8:1.

4. A process for selectively substituting a methyl group for a hydrogen atom in at least one of the positions alpha to a heterocyclic nitrogen atom of a pyridine compound containing at least one and up to two integral pyridine rings, said pyridine compound consisting of carbon, hydrogen and up to two heterocyclic nitrogen atoms, which comprises contacting said pyridine compound with a stoichiometric excess of carbon monoxide and hydrogen in the presence of a catalyst of nickel and nickel oxide at a temperature of from about 150° C. to about 400° C.

5. A process for selectively substituting a methyl group of a hydrogen atom in at least one of the positions alpha to a heterocyclic nitrogen atom of a pyridine compound selected from the group consisting of pyridine, the quinolines, the naphthyridines, the pyridines, and the alkyl-substituted derivatives thereof, which comprises contacting said pyridine compound with a stoichiometric excess of carbon monoxide and hydrogen in the presence of a catalyst of nickel and nickel oxide at a temperature of from about 150° C. to about 400° C. for a period of from about 2 to about 30 seconds.

6. The process of claim 5 wherein the mole ratio of carbon monoxide:hydrogen:pyridine is in the range of about 2:2:1 to about 4:8:1.

7. A process for producing α-picoline which comprises contacting pyridine with carbon monoxide and hydrogen in such amounts as to provide a carbon monoxide:hydrogen:pyridine mole ratio of from about 2:2:1 to about 4:8:1 in the presence of a catalyst of nickel and nickel oxide for a period of from about 5 to about 15 seconds.

8. A process for selectively substituting a methyl group of a hydrogen atom in at least one of the positions alpha to a heterocyclic nitrogen atom of a pyridine compound selected from the group consisting of pyridine, the quinolines, the naphthyridines, the pyridines, and the alkyl-substituted derivatives thereof, which comprises contacting said pyridine compound with a stoichiometric excess of carbon monoxide in the presence of a catalyst of nickel and nickel oxide at a temperature of from 150° C. to about 400° C. sufficient to effect partial decomposition of said pyridine compound.

No references cited.

NICHOLAS S. RIZZO, *Primary Examiner.*

D. DAUS, *Assistant Examiner.*